United States Patent [19]

Horstmann

[11] Patent Number: 4,458,271
[45] Date of Patent: Jul. 3, 1984

[54] METHOD AND CIRCUIT FOR THE TRANSMITTING, RECORDING, AND/OR REPRODUCING OF WIDE-BAND SIGNALS

[75] Inventor: Winfried Horstmann, Griesheim, Fed. Rep. of Germany

[73] Assignee: Robert Bosch GmbH, Fed. Rep. of Germany

[21] Appl. No.: 312,293

[22] Filed: Oct. 16, 1981

Related U.S. Application Data

[63] Continuation of Ser. No. 120,771, Feb. 12, 1980.

[30] Foreign Application Priority Data

Mar. 3, 1979 [DE] Fed. Rep. of Germany ....... 2908321

[51] Int. Cl.³ .................. H04N 9/491; H04N 9/32; H04N 5/91; G11B 5/02
[52] U.S. Cl. .................. 358/310; 358/12; 358/335; 358/141; 360/22; 370/109
[58] Field of Search .................. 358/4, 12, 127, 141, 358/310, 335; 360/22, 30; 455/59, 42, 43; 179/15.55 R; 370/109; 381/34

[56] References Cited

U.S. PATENT DOCUMENTS

| | | | |
|---|---|---|---|
| 3,482,038 | 12/1969 | Warren | 360/30 X |
| 3,742,127 | 6/1973 | Bruch | 358/4 |
| 3,746,781 | 7/1973 | Nakayama | 360/22 X |
| 3,806,640 | 4/1974 | Furukawa | 360/23 |
| 3,830,968 | 8/1974 | Redlich et al. | 360/30 X |
| 4,068,258 | 1/1978 | Bied-Charreton et al. | 360/22 X |
| 4,218,713 | 8/1980 | Norak et al. | 360/22 X |
| 4,312,019 | 1/1982 | Kimura | 360/22 |

FOREIGN PATENT DOCUMENTS 0969818 7/1958 Fed. Rep. of Germany .
55-113106 9/1980 Japan .................. 360/22

OTHER PUBLICATIONS

"Television Broadcasting Tape and Disc Recording Systems", Ennes, Bobbs-Merrill Co., Inc., 1st edition 1973, Chapter 5.

Primary Examiner—Aristotelis M. Psitos
Attorney, Agent, or Firm—Frishauf, Holtz, Goodman & Woodward

[57] ABSTRACT

A method and a circuit for transmitting or storing a wide-band signal in several, narrow-band channels, wherein frequency modulation and demodulation occur in the wideband channel. The uniformity of the transmission characteristics of the entire system is improved by obviating the necessity for multiple modulators and demodulators in the individual transmission channels.

8 Claims, 3 Drawing Figures

METHOD AND CIRCUIT FOR THE TRANSMITTING, RECORDING, AND/OR REPRODUCING OF WIDE-BAND SIGNALS

This is a continuation of application Ser. No. 120,771 filed Feb. 12, 1980.

The invention relates to a method for transmitting or storing wide-band signals in several narrow-band channels by sub-dividing the original signal into segments which are subjected to a first time transformation (expansion) prior to transmission or storage and subsequently to a second, reciprocal, time transformation (compression).

BACKGROUND AND PRIOR ART

A method for transmitting and recording signals covering a broad frequency band is known, for example, from German Pat. DE-PS 969 818 Ewerbeck. In the known method, the signal is split into several signals of narrow frequency width which are transmitted or recorded independently. In order to produce a plurality of signals equal in number to the number of available transmission channels, momentary values of the output signal are scanned with the aid of phase-shifted pulse trains. The chronologically correct recombination of the intermediate signals, which were transmitted or recorded in the individual channels, into the original signal, requires transmission of the scanning signal.

The known method is not suitable for the transmission or recording of frequency-modulated signals in which the momentary values of the signal differ only in frequency but not in amplitude. Carrier frequency based transmission of the intermediate signals is basically conceivable and would also lead to a reduction of the required bandwidth of the individual transmission channels for the intermediate signals as compared to the bandwidth required for transmitting a frequency-modulated output signal. However, the equalization of the necessarily large number of modulators and the appearance of phase errors during recombination of the intermediate signals into the original signal cause extraordinary difficulties. In particular, where the intermediate signals are stored in several tracks of a magnetic tape, inaccuracies of the tape movement lead to intolerable phase errors among the individual channels and prevent satisfactory demodulation of the intermediate signals and gap-free recombination.

Another system for decreasing the bandwidth requirement of a video recording and reproducing unit is known from the German published application DE-AS No. 22 37 255, to which U.S. Pat. No. 3,806,640, Furakawa, corresponds. As described there, a video signal containing arbitrary information is divided into a number of signals. These signals are recorded in several channels containing storage circuits. The video signal is shifted into a lower frequency range by performing the readout of the signal during a longer time interval than was used for recording. During reproduction, the recorded signals are again written into storage circuits and are then released in a shorter time interval than the write-in time interval. In this manner, the original time scale and the original video signal are restored.

THE INVENTION

It is a principal object of the present invention to provide a method for transmitting or storing wide-band signals in which the number of modulators and demodulators required for carrier-frequency transmission of the partial signals does not depend on the number of transmission channels, and in which, preferably, the tuning of the individual transmission channels is simple. Briefly, according to the invention, frequency modulation prior to sub-dividing the continuous signal into a plurality of signals distributed to individual channels.

For use as television signals the signal segments subjected to time transformation advantageously correspond to one TV line length and the switching processes preferably occur in the gaps between signal-sensing intervals.

A particular advantage of the invention is that transmission errors, especially amplitude errors of the transmission system, do not influence the level of the demodulated video signal, regardless of which of the transmission channels the signal is momentarily derived from. In this way, the component signals can be more readily re-combined to form the original signal with precisely correct timing and phase.

In an advantageous feature of another embodiment of the invention, a color information signal is transposed into a frequency band which is largely free of FM sidebands, and is added in carrier-based form to the FM modulated composite television signal before signal division and time transformation. Analogously, the signal is retransformed and retransposed before being recombined with the demodulated composite television signal. The elements needed for time transformation can thus be used for both signal components (luminance, chrominance) simultaneously.

Advantageously, the separation takes place only after performing a time error compensation for both signal components.

THE DRAWING

DETAILED DESCRIPTION OF THE INVENTION

Figure 1:
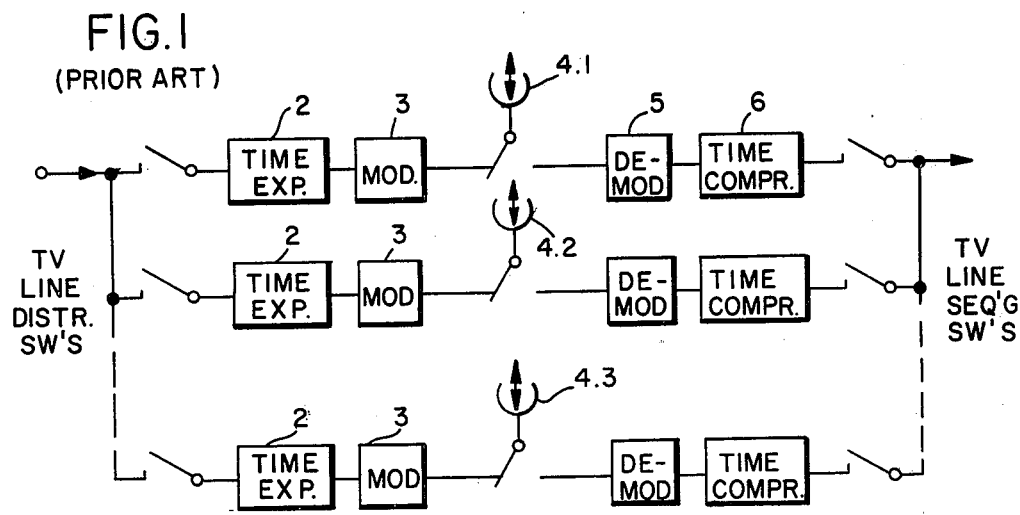
FIG. 1 is a schematic block diagram of a known circuit for carrier frequency based recording and reproduction of a video signal in several adjacent tracks.

The diagram of FIG. 1 represents an example of the current state of the art, according to which segments of television signals arriving at terminal 10 are subjected to a time transformation, e.g., time expansion in time stages Z. The time-transformed signal segments are simultaneously assigned to respective channels and are used to modulate in modulator 3 a carrier frequency, whereafter they are recorded by transducer 4.1, 4.2 ... 4n of a tape. Because the modulation takes place after the segmentation and time transformation, the required number of modulators and of demodulators 5, as well of time retransformation stages 6 is equal to the number of channels or recording tracks used. A disadvantage of this system is the difficulty of obtaining exactly equal transmission characteristics for all channels and for the channel-related time transformations of the video signals. Success cannot always be achieved.

Figure 2:
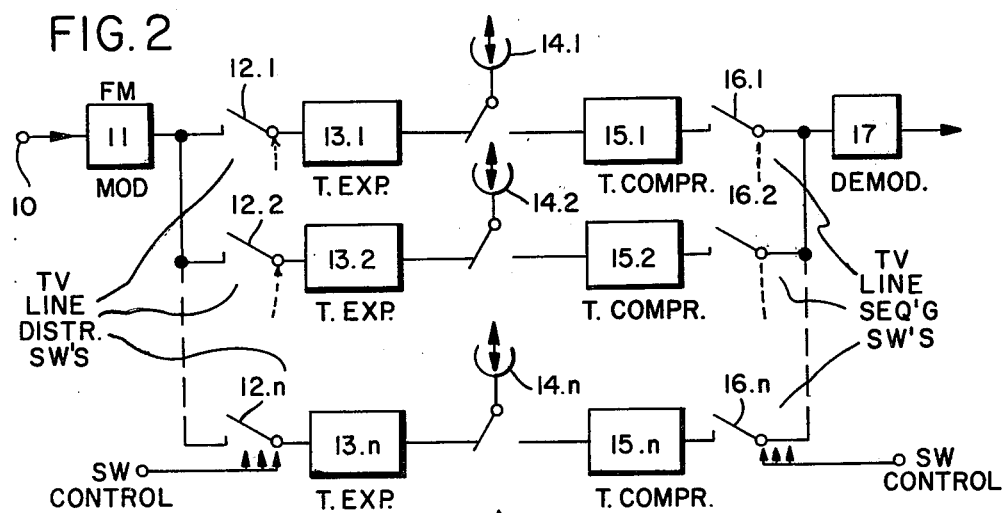
FIG. 2 is a schematic block diagram of a circuit according to the invention for carrier frequency based recording and reproducing of a video signal within several adjacent tracks.

In the method according to the invention which can be practiced with an exemplary system illustrated in FIG. 2, the video signal arriving at point 10 is conducted to the input of a modulator 11, and is used to impress a modulation upon a carrier frequency in known manner. The frequency-modulated signal appearing at the output of the modulator 11 is distributed sequentially to n signal channels according to the position of the switches 12.1, 12.2, . . . 12.n. The switching sequencing control signal may be a timing signal present in the original signal, or a multiple or submultiple thereof.

The signal segments in the individual channels for recording on individual tracks are expanded by a factor of "n" in the time expansion elements 13.1, 13.2, . . . 13.n, resulting in a frequency transformation by the factor 1/n. The expanded and frequency-shifted signal segments are then recorded by means of transducer elements 14.1, 14.2, . . . 14.n onto adjacent tracks of a magnetic tape (not shown). For reproduction, the time-expanded signal segments stored on the magnetic tape are read out by means of the transducers 14.1, 14.2, . . . 14.n, and are transmitted to the time transformation elements 15.1, 15.2, . . . 15.n which perform a time compression. The signal segments present at the output of the time compression elements 15.1, 15.2, . . . 15.n once again correspond to the signal segments present at the output of the switches 12.1, 12.2, . . . 12.n prior to expansion, and can thus be reassembled into a continuous, frequency-modulated signal by means of similar multiple switches 16.1, 16.2, . . . 16.n. The reassembled signal passes through the demodulator 17 and appears at its output as a demodulated, original video signal.

Figure 3:
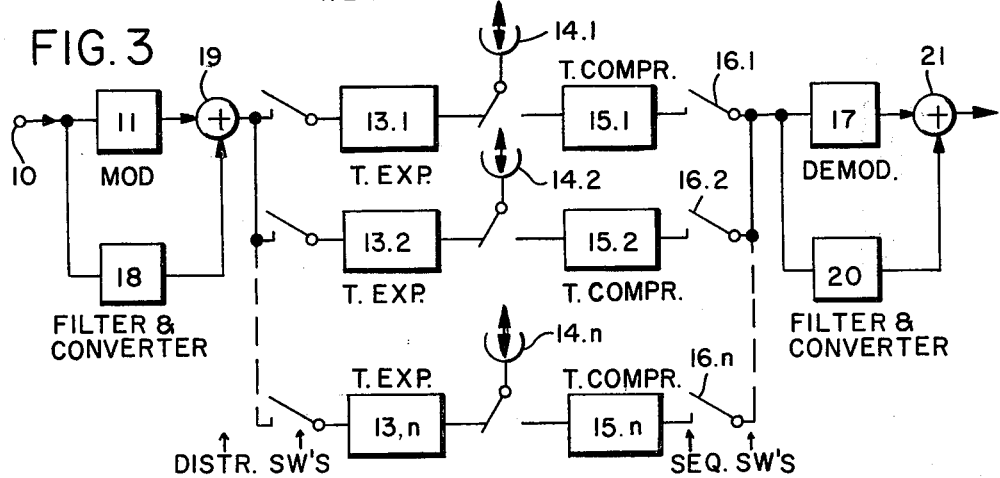
FIG. 3 is a schematic block diagram of a second embodiment of the circuit according to the invention.

The second embodiment of the invention, illustrated in FIG. 3, contains some of the same circuit elements shown in FIG. 2; they perform similar functions and carry the same reference numbers. In addition, the circuit according to FIG. 3 includes a filter and converter 18 for filtering the color information, or chrominance signal component out of the complete color video signal and shifting the carrier-based color selection, or chrominance signal component from, for example, 4.43 MHz to 0.562 MHz. This shifted color signal is superimposed onto the frequency-modulated composite television signal in the summing circuit 19.

In a similar manner, the color component at 0.562 MHz is filtered out of the FM-modulated signal after the transmission, or storage, and is reconverted in the converter 20 to a frequency of 4.43 MHz, whereafter it is reassembled into the complete composite television signal in the summing circuit 21.

The circuit according to the invention can thus carry out a method for storing frequency-modulated signals in several tracks or for transmitting them in several channels which makes it possible to equalize the transmission characteristics of the individual channels more easily than was heretofore possible.

The method system and apparatus of the invention are capable of modifications and of combinations of individual features lying within the competence of a person skilled in the relevant art without departing from the scope thereof.

I claim:

1. A method for transmitting or storing composite television signals in a plurality of narrow-band channels, comprising the steps of frequency modulating the signals on a carrier to obtain a frequency modulated carrier signal;
then subdividing the frequency modulated carrier signal into sequential individual signal segments, respectively corresponding to different television lines, for signal processing of said individual signal segments in individual channels with distribution of said segments among said channels by switching performed in the intervals between television lines;
time expanding the individual signal segments in said individual channels;
transmitting or storing said individual signal segments in said individual channels;
subjecting the individual transmitted or stored signal segments to a reciprocal time compression at the terminus of the transmission line or in a step of retrieval from storage;
and recombining and demodulating the compressed signal segments collected from said channels.

2. A method according to claim 1, wherein the step of demodulating the frequency modulated signal takes place after recombination of the individual recompressed signal segments.

3. A method according to claim 2, further comprising the steps of filtering the color information out of a complete color television signal;
modulating an auxiliary carrier with the color information;
converting the modulated signal to a lower frequency band selected for being largely free of sidebands of said frequency modulated carrier signal;
and adding the color information signal, as converted to said lower frequency, in carrier-based form to the remaining frequency modulated carrier signal after modulation but prior to said signal-subdividing step.

4. A method according to claim 3, comprising the further steps of filtering out the converted color signal from the recombined signal before demodulation, reconverting it to its original frequency, and additively superimposing it onto the demodulated composite television signal.

5. System for transmitting or storing composite television signals in a plurality of narrow-band channels, each containing signal segments respectively carrying different information, comprising means (10) for receiving said signals;
frequency modulating means (11) connected to said receiving means for frequency modulating receiving continuous broadband signals to obtain a frequency modulated carrier signal;
sequencing switch means (12.1, 12.2 . . . 12.n) connected to said modulator means and sequentially energized, and having output connections to respective ones of said channels for switching multi-cycle continuous segments of said frequency modulation carrier signal respectively corresponding to different television lines, sequentially to said channels in turn by switch operations occurring in the intervals between television lines;
individual time expansion stages (13.1, 13.2 . . . 13.n) in said channels and selectively, sequentially connected by said sequencing switch means (12.1, 12.2 . . . 12.n) for, sequentially, receiving said frequency modulated carrier signal elements, and time-expanding said signal segments;
and transmission or storage means (14.1, 14.2 . . . 14.n) connected to respective time expansion stages for receiving said time expanded signal segments and transmitting or storing said time expanded signal segments in respective transmission or storage channels.

6. A circuit according to claim 5, wherein the signal is a color television signal and further comprising a filter and converter (18) for separating and shifting the chrominance component of the color television signal into another frequency region selected for being largely free of sidebands of said frequency modulated carrier signal, and a first summing stage (19) for superimposing the shifted color signal onto the remaining FM-modulated signal at the output of the frequency modulating means (11).

7. System according to claim 5, further including a plurality of time compression stages (15.1, 15.2 ... 15.n), one each associated with a channel, for receiving said transmitted or stored signal segments and time compressing said signal segments;

sequencing switch means (16.1, 16.2 ... 16.n) connected for receiving said recompressed signal segments from said time compression stages and reordering into their original sequence the individual signal segments from said plurality of channels to which said sequencing switches are connected;

and a demodulator (17) connected to said receiving sequencing switches for demodulating the sequenced signal segments to obtain a reconstituted broad-band signal.

8. A circuit according to claim 7, wherein the signal is a color television signal and further comprising a filter and a converter (18) for separating and shifting the chrominance component of the color television signal into another frequency region selected for being largely free of sidebands of said frequency modulated carrier signal, and a first summing stage (19) for superimposing the shifted color signal onto the remaining frequency modulated signal at the output of the frequency modulating means (11);

and further comprising a reconverter (20) for separating deriving and transforming the chrominance signal component into its original frequency band, and a second summing stage (21) for superimposing the chrominance information component, furnished by the output of said reconverter, onto the demodulated video signal obtained at the output of the demodulator (17).

* * * * *